United States Patent [19]

Siegler

[11] Patent Number: 4,582,257
[45] Date of Patent: Apr. 15, 1986

[54] SPRINKLER HOSE WITH SELF WINDING CAPABILITY

[76] Inventor: Frederick Siegler, 444 N. Citrus Ave., Los Angeles, Calif. 90036

[21] Appl. No.: 560,589

[22] Filed: Dec. 12, 1983

[51] Int. Cl.$^4$ ............................................. B65H 75/00
[52] U.S. Cl. ................................ 239/197; 137/355.23; 239/198
[58] Field of Search ............... 239/195, 197, 198, 196, 239/199, 450; 137/355.23–355.27

[56] References Cited

U.S. PATENT DOCUMENTS

| | | | |
|---|---|---|---|
| 1,322,604 | 11/1919 | Nuhring | 137/355.26 X |
| 1,675,140 | 6/1928 | Schenderlein | 137/355.23 X |
| 2,742,242 | 4/1956 | Godwin | 137/355.23 X |
| 2,814,529 | 11/1957 | Arnt | 239/450 X |
| 3,603,511 | 9/1971 | LaPierre et al. | 239/450 |

FOREIGN PATENT DOCUMENTS

| | | | |
|---|---|---|---|
| 530940 | 9/1956 | Canada | 239/197 |
| 1322668 | 2/1963 | France | 239/199 |

Primary Examiner—Jeffrey V. Nase
Assistant Examiner—Daniel R. Edelbrock
Attorney, Agent, or Firm—Thomas I. Rozsa

[57] ABSTRACT

The present invention relates to a novel design for a perforated hose sprinkler which enables the hose to automatically rewind itself after use and after being released from a secured position in the ground. The mechanism includes a frame member with a reel contained within the frame and rotatably supported thereon on a fixed shaft. The reel further comprises a central core section. A spring is fixedly secured at one end to the fixed shaft and fixedly secured at its other end to the core of the reel, and is wound between the fixed shaft and the core. A sprinkler hose which is generally rectangular in cross-section and contains a multiplicity of pin holes along its length is wound onto the reel. The frame further comprises a slotted member through which the sprinkler hose can pass and which serves to provide tension to prevent the hose from retracting and further provides an effective seal to prevent water from running into any portion of hose that remains unwound on the reel. The hose is sealed at the end attached to the reel and the water source is attached to the hose at the end remote from the reel. Molded-in spikes permit the frame to be inserted into the ground and an additional spike permits the remote end of the hose to be inserted into the ground while the hose is in use.

3 Claims, 9 Drawing Figures

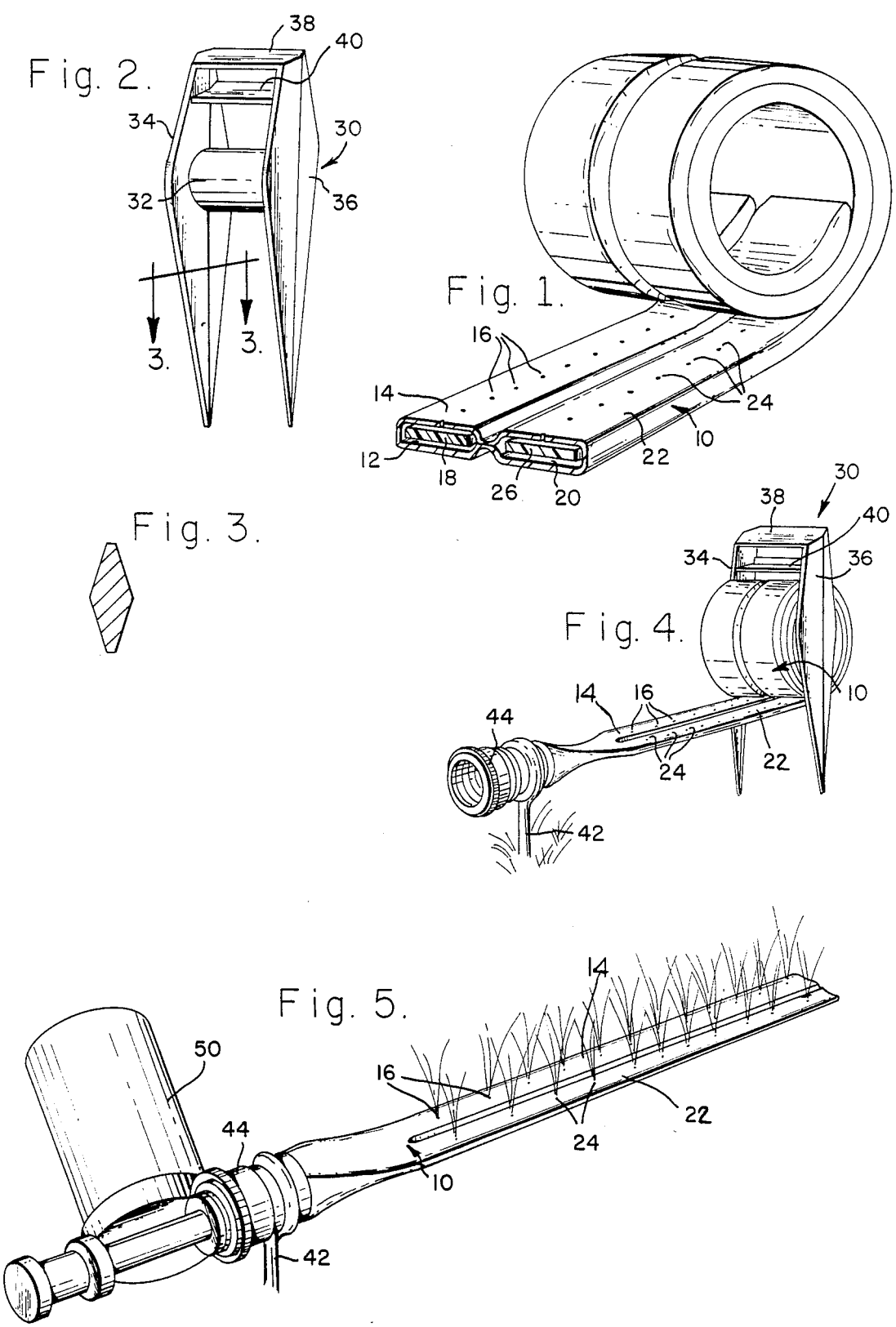

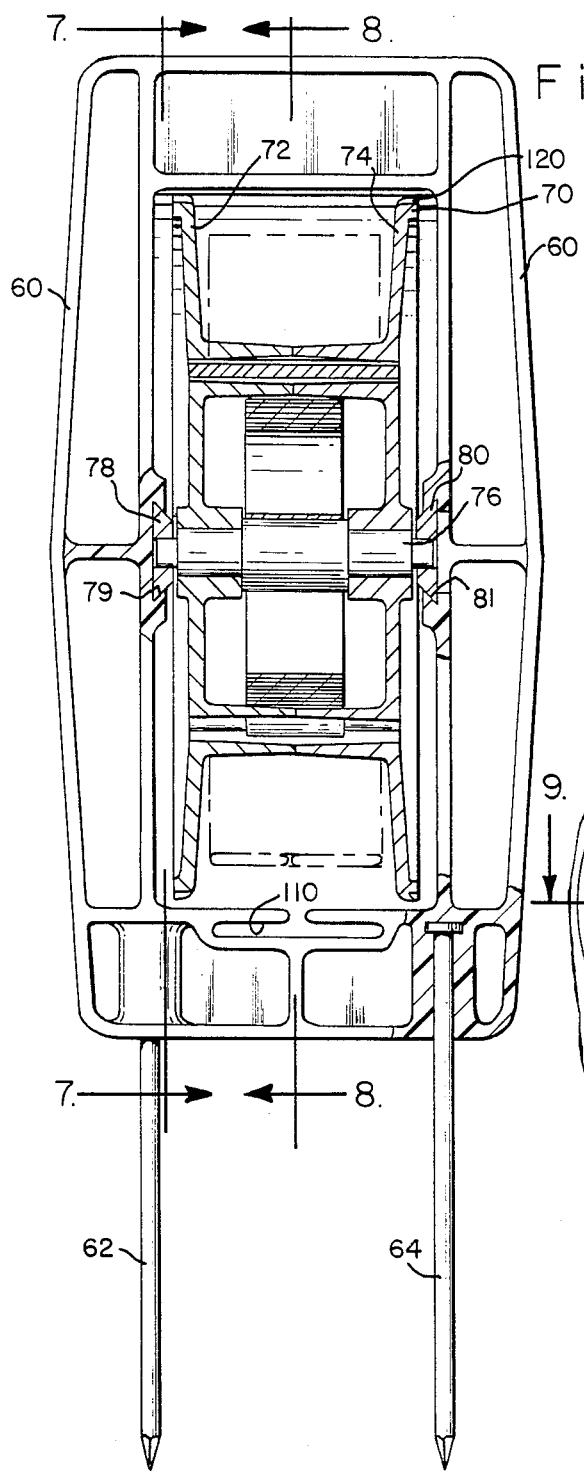
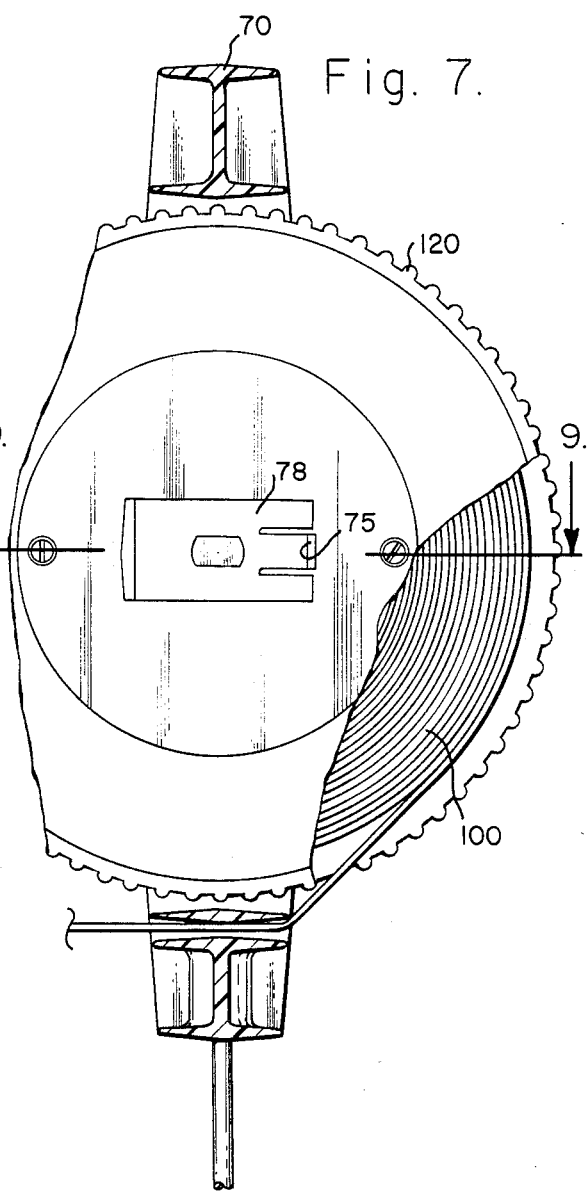
Fig. 6.
Fig. 7.

SPRINKLER HOSE WITH SELF WINDING CAPABILITY

BACKGROUND OF THE INVENTION

1. Field of the Invention

The present invention relates to garden sprinkler hoses and more particularly to perforated hose sprinklers which distribute the water evenly in a fine mist. The present invention relates to a novel apparatus for enabling the hose to have a self winding feature to permit the hose to be rapidly rewound on its reel after use. The present invention also relates to a novel design for the hose and its attachments which eliminates the requirement for expensive rotary seals and assures that there will not be significant leakage from the hose at the location adjacent the reel on which it is wound. The present invention also relates to improvements in the reel assembly which enables it to rewind the hose after use.

2. Description of the Prior Art

In general, perforated hose sprinklers have been in use for many years. The hose is generally flat and is generally rectangular in cross section. In operation, the hose is laid flat on the ground. The upper surface of the hose contains a multiplicity of pin holes at evenly spaced locations along the length of the hose. Water is permitted to run through the hose and exits the hose in an even fine mist through the multiplicity of pin holes.

In the most common embodiment, the perforated hose sprinkler is sold in a long unwound length which is laid flat on the ground. The front end of the hose is sealed. The rear end contains a conventional coupling which is attached to the source of water. A major problem with this design is that after use, it is very difficult to efficiently store the hose. The hose frequently becomes tangled during storage and sections of hose are bent and twisted. As a result, a tear frequently occurs in several portions along the length of the hose, thereby resulting in a significant loss of efficiency. After numerous tears, the hose becomes useless.

One improvement in the non perforated standard sprinkler hose management is that the hose is wound on a reel when not used. The hose is unwound when in use. The water enters the hose at the reel through a rotary seal and is discharged at the free end through a typical hand held spray head. One very significant disadvantage with this design is the requirement for expensive rotary seals to be used at the location of the coupling on the section of hose attached to the reel or on the coupling in the reel itself. After a few uses, the rotary seal frequently develops leaks. As a result, the user becomes soaked when he turns the water source on and when he turns the water source off. In addition, the leaks substantially reduce the amount of water which goes through the hose. Therefore, there is a significant waste of water. In addition, manual rewinding of the wet hose after use affords the user another opportunity to become wet. Furthermore, state of the art hoses must be completely unwound prior to use, which makes handling difficult and becomes more time consuming.

Therefore, while hoses wound on reels are known in the prior art, all of the known prior art embodiments contain the disadvantages set forth above. Perforated hoses are not wound on reels in the prior art, which further creates the disadvantages described above.

SUMMARY OF THE PRESENT INVENTION

The present invention relates to a novel design for a perforated garden sprinkler hose which is wound on a reel. The novel design for the hose eliminates the use of expensive rotary seals at the location of the reel. In addition to reducing the cost, the novel design also eliminates the significant leakage at the location of the reel. Another novel feature of the present invention provides a self winding capability, either on the reel for the hose or directly into the hose itself.

It has been discovered, according to the present invention, that if a perforated garden sprinkler hose contains a coupling to a water source at its front end and is sealed at the rear end which is attached to a reel, then the requirement for costly rotary seals at the location of the reel is eliminated and the significant leaks in the seals at the location of the reel are also eliminated.

It has also been discovered, according to the present invention, that the perforated hose can be unwound to any desired length and be operational, while the prior art hoses must be completely unwound from the reel where the water enters before they can be used.

It has also been discovered, according to the present invention, that if a spring mechanism is inserted into the perforated hose sprinkler, then the hose can rewind itself on the reel after being disconnected from the water source and released from a securing means which retained the front end of the hose in the ground.

It has further been discovered, according to the present invention, that if the reel itself is equipped with a spring mechanism to rewind the hose after use, then the hose can also rewind itself on the reel after being disconnected from the water source and released from a securing means which retained the front end of the hose in the ground.

It has also been discovered, according to the present invention, that if the frame of the reel is equipped with a slot to accommodate the hose, then the slot acts as a seal to assure that very little, if any, water will travel to the unwound section of hose remaining on the reel. Additionally, the slot serves as a tension release mechanism on the hose and therefore the hose can be placed in a curved, as well as a straight, position.

It has also been discovered, according to the present invention, that if the exterior walls of the reel contain bumps, then the hose can be manually rewound on the reel by moving a person's fingers over the bumps.

It has further been discovered, according to the present invention, that if the reel contains a spring to rewind the hose, then the use of dovetailed shaft supports on the reel permits the reel spring to be wound up prior to assembly by using the support as a handle and further permits the entire frame to be injection molded in one piece. The use of these novel supports also allows positioning of the reel in the appropriate x-y-z direction relative to the frame by snapping the reel assembly in place on the frame.

It is therefore an object of the present invention to provide a novel design for a perforated garden sprinkler hose which contains a coupling to a water source at its front end and is sealed at its rear end which is attached to a reel. It is further object of the present invention to eliminate costly rotary seals at the location of the reel and thereby eliminate significant leaks at the location of the reel.

It is another object of the present invention to provide a perforated sprinkler hose with self winding capability through either a novel spring design which is inserted directly into the hose, or alternatively through a novel spring design which is located on the reel from which the hose is stored and unwound when in use.

It is a further object of the present invention to provide novel features on the frame of the reel to reduce water flow to the section of hose which remains on the reel during use and to further reduce spring tension on the unwound section of hose to thereby permit it to be placed in circular as well as straight patterns on the lawn.

It is yet another object of the present invention to provide a novel reel and frame design which permits ease of manufacture and ease of assembly of the completed unit.

It is yet another object of the present invention to unwind only as much hose from the reel as needed to aid hose mangement and save winding effort and time to improve on the state of the art systems.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

FIG. 1 is a perspective view of a partially unwound perforatred hose sprinkler with the novel spring mechanism of the present invention inserted within the hose.

FIG. 2 is a perspective view of the frame to be used with the present invention perforated hose sprinkler which contains a spring mechanism within the hose.

FIG. 3 is a cross-sectional view of a frame member taken along line 3—3 of FIG. 2.

FIG. 4 is a perspective view of the completed assembly of the present invention perforated hose sprinkler with the hose partially unwound from the cylindrical member of the frame which may be fixed and part of the frame, of which may be a reel free to rotate about an axis connecting the two vertical frame members.

FIG. 5 is a perspective view of the front end of the hose of the present invention being used in conjunction with an automatic fertilizing attachment.

FIG. 6 is a front plan view of a frame and reel assembly wherein the reel contains a spring mechanism therein for use with a perforated sprinkler hose wound on the reel.

FIG. 7 is a cross-sectional view taken along line 7—7 of FIG. 6.

DETAILED DESCRIPTION OF THE PREFERRED EMBODIMENT

Figure 8:
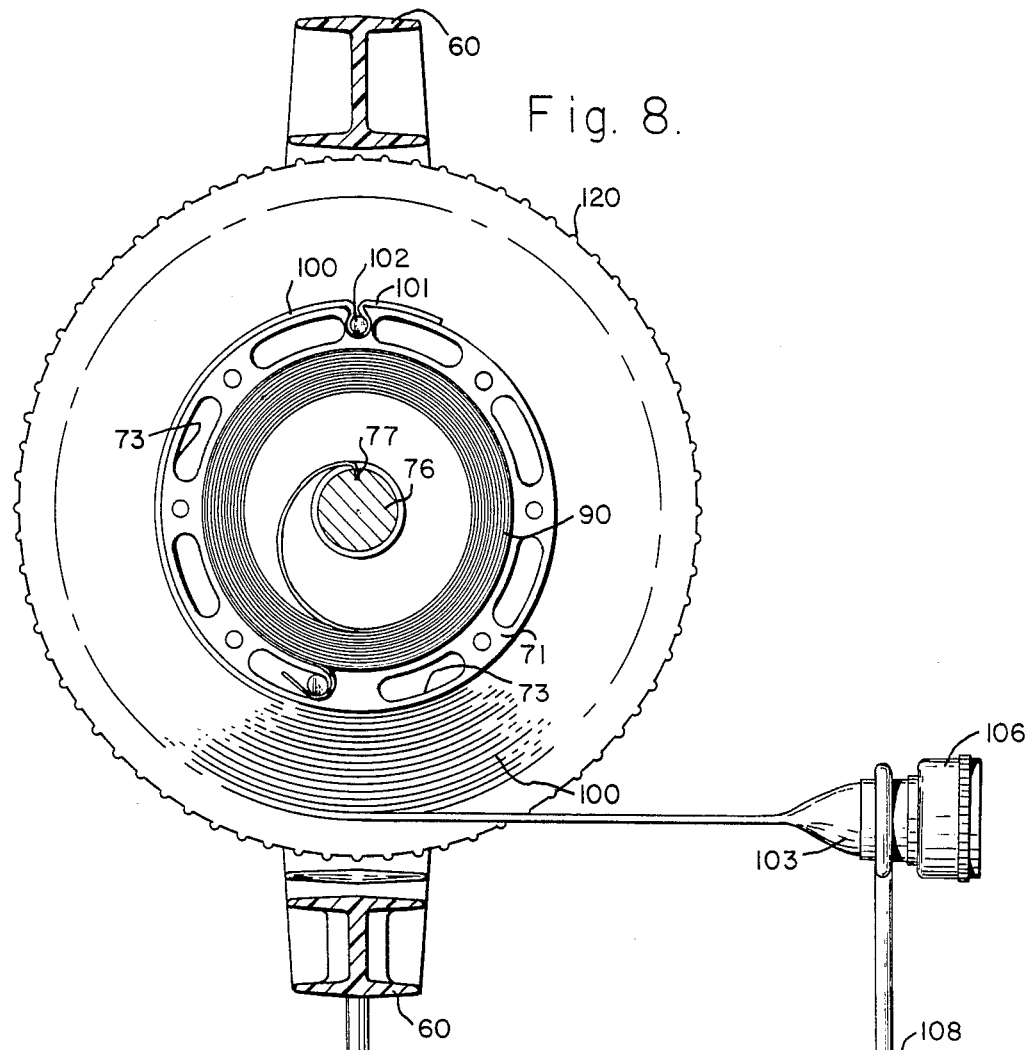
FIG. 8 is a cross-sectional view taken along line 8—8 of FIG. 6.

Although specific embodiments of the present invention will now be described with reference to the drawings, it should be understood that such embodiments are by way of example only and merely illustrative of but a small number of the many possible specific embodiments which can represent applications of the principals of the invention. Various changes and modifications to one skilled in the art to which the invention pertains are deemed to be within the spirit, scope and contemplation of the invention as further defined in the appended claims.

The first embodiment of the present invention self winding sprinkler hose is a device which efficiently irrigates large lawn and garden areas, has no moving parts, is cost effective to manufacture and is easy to manage because after use it winds itself up into a compact package to be relocated or stored. FIG. 1 is a perspective view of a partially unwound perforated hose sprinkler with the novel spring mechanism of the present invention inserted within the hose. The hose is shown at 10 and is a generally flat longitudinal strip of material such as vinyl plastic. The extruded hose 10 contains two chambers, 12 and 20 respectively, which are each generally rectangular in cross section. The top surface 14 of chamber 12 contains a multiplicity of pin holes 16. The top surface 22 of chamber 20 contains a multiplicity of pin holes 24. The self winding feature is accomplished by inserting into each chamber, 12 and 20, a spring mechanism.

Spring mechanism 18 is inserted into chamber 12 and spring mechanism 26 is inserted into chamber 20. One type of spring mechanism can be achieved as follows. A thermoplastic strip such as styrene is inserted in each chamber. The hose prepared in this fashion is wound tightly on a proper size core and strapped to prevent it from unwinding. The inserted hose coil is boiled in water to heat set the thermoplastic strips into a clock spring configuration. An alternative type of spring mechanism 18 and 26 can be a stainless steel spring which is manufactured into the chamber 12 and 20 as the length of hose 10 is produced. Through use of the thermoplastic strip, the desired length of hose must be selected and then wound and heated as just described. The alternative use of the stainless steel spring increases the costs of manufacture, but provides the ability to manufacture the hose with a pre stressed metal spring inside. In this case, the coiled springs are stretched flat and two halves of plastic strips, one solid below the springs, one perforated above the springs, are joined at the two sides and in the center by welding or other methods to form chambers 12 and 20.

After the desired length of hose 10 has been manufactured, the rear end of the hose is sealed and is attached to a reel. The front end of the hose is equipped with a standard hose fitting to enable the hose to be attached to a source of water.

FIG. 2 is a perspective view of a reel and frame assembly which is used with the present invention perforated hose sprinkler which contains a spring mechanism within the chamber of the hose. The reel and frame assembly 30 consists of a central cylinder 32 interposed between opposite frame side walls 34 and 36. The cylinder 32 can then be fixed to frame side walls 34 and 36 or else have the capibility to rotate on an internal shaft between the frame side walls. Either design can operate properly with the present invention. The frame further comprises a top cross-member 38 and a handle 40. As shown in the cross-sectional view in FIG. 3, side walls 34 and 36 are generally diamond shaped in cross-section. Since the front and rear ends are generally pointed, as shown, the hose 10 will not catch on the frame members 34 and 36 as the hose is unwound from reel 32 and snakes back onto the cylinder 32. The bottom of frame side wall 34 is pointed and the bottom of frame side wall 36 is also pointed. In this manner, the bottom of each side wall acts like a stake to enable the frame to be inserted into the ground. The cylinder can be a stationary cross member of the molded frame on which the self winding hose snakes, or it may be a cylinder that can rotate about a shaft connecting side walls 34 and 36. Both configurations have been reduced to practice.

The completed assembly of the present invention is shown in FIG. 4. The spiked frame 30 has been inserted into the ground by means of the pointed tips of frame side walls 34 and 36. The desired length of hose 10 is unwound. A spike 42 is located adjacent the front end of the hose 10 to also enable it to be inserted into the ground. The coupling 44 on the front end of the hose is attached to the hose leading from the water source, such as a regular hose. When watering is completed, the coupling 44 is uncoupled from the water source and the spike 42 is released. The hose then automatically rewinds itself on the cylinder or reel 32. Alternatively, if the cylinder is rotatable, it can be rotated to rewind the hose.

Through use of the present invention as described above, water leaks at the location of the reel 32 are substantially reduced. Since the end of the hose 10 attached to the reel 32 is sealed, no expensive rotary seals are required. For unused portions of hose, the overlapping of one winding of hose upon another further serves to seal the pin holes on the unwound portion of hose to further reduce water leakage at the location of the frame as the remaining coils under pressure wedge between cylinder 32 and top cross member 38 or handle 40. Since the coupling is located at the front end of the hose instead of at the end attached to the cylinder, only a simple seal is required at the location of the coupling. As shown in FIG. 5, this embodiment also permits use with numerous attachments such as an automatic fertilizer 50, such as a "mixerator" which is described in U.S. Pat. No. 3,323,685. With this embodiment of the present invention, the mixerator fertilizer attachment can simply be attached to the coupling end of the hose and permitted to operate by itself. In prior art use, the user had to manually hold a sprinklerhead to which the mixerator was attached and be physically present. This requirement to hold the mixerator and possibly become wet or sprayed with fertilizer is eliminated through use of the present invention.

Through use of the spring means, any desired length of hose can be unwound from the reel and set in the ground through spike 42. When use is finished, the hose easily rewinds itself onto the reel. The spring means 18 and 26 can be made of metal springs such as stainless steel or cadmium plated carbon steel. Alternatively, the thermoplastic material such a styrene can be used for the springs, provided the thermoplastic is heat set into a clock spring configuration as previously described. The hose is made of flexible material such a vinyl plastic.

A second embodiment of the present invention incorporates a spring mechanism within the frame and reel assembly on which the perforated hose sprinkler is wound and not within the hose chambers.

FIG. 6 is a front plan view of a frame and reel assembly wherein the reel contains a spring mechanism therein for use with a perforated sprinkler hose wound on the reel. In the preferred embodiment, the body of frame 60 is molded in one piece construction. A frame made of multiple piece construction is certainly within the spirit and scope of the present invention. The frame 60 is preferably made of plastic material and is preferably injection molded. The lower portion of frame 60 contains a pair of molded-in spikes, 62 and 64, which serve to locate the frame 60 in the ground. The spikes 62 and 64 penetrate the soil and serve to hold the frame 60 securely in the ground. By way of example, the spikes can be made of metal such as a large nail.

Located in the central portion of frame 60 is a reel 70. In the preferred embodiment, the reel 70 is comprised of two identical mating halves, 72 and 74. The reel 70 is supported on a stationary shaft 76. The shaft 76 is in turn supported on a pair of dovetailed shaft supports 78 and 80 which snap into correspondingly formed grooves 79 and 81 respectively in frame 70.

Figure 9:
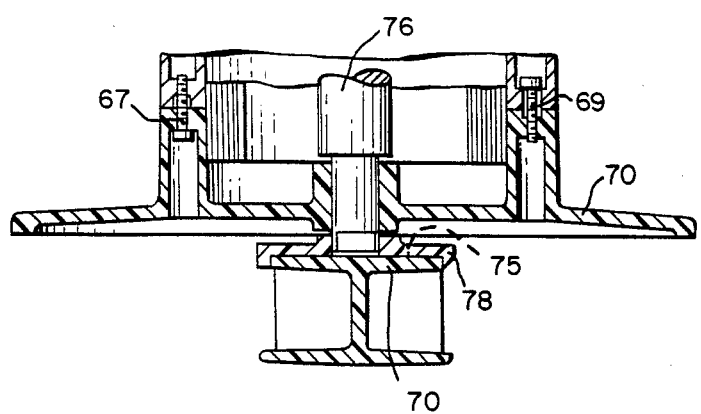
FIG. 9 is a cross-sectional view taken along line 9—9 of FIG. 7.

The spring mechanism 90 is best illustrated in the cross-sectional view of FIG. 8. Reel 70 contains a core member 71 which has a multiplicity of channels 73. The spring mechanism is fixedly attached to a slit 77 in stationary shaft 76 and is wound within core member 71. The opposite end of spring member 90 is fixed within one of the channels 73 in core 71. The spring member 90 can be a clock spring. The spring 90 is wound before the reel 70 is inserted into frame 60. The dovetailed shaft supports 78 and 80 permit the spring 90 to be wound up prior to assembly of the reel 70 into frame 60. Part of the shaft supports 78 and 80 have a tongue which is like a leaf spring and snaps into place inside grooves 79 and 81 and attach onto a portion of frame 70, as shown in FIG. 9 by snapping in place with the tongue portion 75 of the shaft support 78. The shaft supports 78 and 80 thus prevent the shaft 76 from rotating, thereby grounding the end of spring 90 which is inserted into slit 77 in shaft 76.

Hose 100 is locked into one of the channels 73 in core 71 by means of seal pin 102. By this locking means, the end 101 of perforated sprinkler hose 100 is sealed. The hose 100 is then wound around the outer periphery of core 71 on reel 70. The front end 103 of perforated sprinkler hose 100 is attached to a coupler 106 which is in turn attached to a source of water. An optional spike 108 is used to set the front end 103 of the hose 100 into the ground. As with the previous embodiment, the frame 60 is placed into the ground and held therein by spikes 62 and 64 and the desired length of perforated sprinker hose 100 is unwound from reel 70. The coupler 106 is attached to the source of water and the spike 108 is also placed into the ground to anchor the front end 103 of hose 100. When the sprinkling is completed, the coupler 106 is disconnected from the water source, the spike 108 is removed from the ground and the hose 100 is automatically rewound onto reel 70 by means of the spring 90. This embodiment offers the same advantages as the previous embodiment, namely the ability of the user to have the wet hose automatically rewound. The fact that the end of the hose attached to the reel is sealed assures that there will be no leak at the location of the reel. Once again, the use of costly rotary seals is eliminated. The overlapping of unused portions of hose on the reel 70 serves to self-seal that portion of the hose from water coming through the pin holes on the upper surface of the perforated sprinkler hose 100.

An optional novel feature of the present invention which can be used with the spring inside the reel embodiment is the incorporation of a slot inside the frame and configured to permit the hose to pass through the slot. This slot 110 is shown in FIG. 6. The cross-section of the slot is slightly larger than the cross-section of the unwound hose. One function of the frame slot 110 is to restrict and oppose the rewind force of the spring 90. When the hose 100 is slid in the frame slot 110 so that the hose passes through this slot while being unwound, then the frame slot 110 serves to counteract the rewind force of the spring 90 and serves to keep the hose 100 in the fully extended or used position. Since the portion of hose which is beyond the slot is not under spring tension, the hose 100 can be configured in any shape, such as curved, as well as straight. Since perforated hoses of this type expand as water enters them, a second function of the frame slot 110 is to restrict the flow of water so that very little water goes past the slot to the portion of hose which is unwound and still on the reel. This further serves to significantly reduce any leakage at the location of the reel.

Another optional feature on the reel 70 is a multiplicity of bumps or serrations 120 located along the circumference of the reel 70. The bumps or serrations 120 on the periphery of the reel permit manual hose rewinding in case of spring failure.

The present invention is not restricted to any specific embodiment for the reel 70. As previously described, the reel 70 is composed of two halves 72 and 74 which are joined together at the center. As shown in FIG. 9, the two halves are held together by means of screws 67 and 69. It is also within the spirit and scope of the present invention for a reel of one piece construction or of multiple piece construction to be used with the present invention.

Defined in broader terms, the present invention is a perforated hose sprinkler comprising a frame and a reel contianed within said frame and supported therein. A length of perforated hose is sealed at its rear end and attached at its rear end to the reel and wound around the reel. A coupling means is located at the front end of the length of perforated hose. The perforated hose further contains a multiplicity of pin holes at spaced locations on its upper surface. The length of perforated hose further comprises internal channels running the length of the hose and spring means located within the internal channels. As an optional feature, the reel on which the length of hose is wound can rotate within the frame.

Defined in braoder terms, the second embodiment of the present invention is a perforated hose sprinker comprising a frame and a reel contained within said frame and rotatably supported therein on a fixed shaft. The reel further comprises a central core section on the fixed shaft. Spring means is fixedly secured at one end to the fixed shaft and fixedly secured at its other end to the core of the reel, and wound between the fixed shaft and the core. A length of perforated hose is attached at one end to the core of the reel and wound around the reel. A coupling means is located at the front end of the length of perforated hose. The perforated hose contains a multiplicity of pin holes at spaced locations on its upper surface.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not show all of the various forms or modifications in which the invention might be embodied or operated.

The invention has been described in considerable detail in order to comply with the patent laws by providing a full public disclosure of at least one of its forms. However, such detailed description is not intended in any way to limit the broad features or principals of the invention, or the scope of the patent monopoly to be granted.

What is claimed is:
1. A perforated sprinkler hose assembly comprising:
   a. a generally rectangular shaped frame;
   b. said generally rectangular shaped frame including a centrally disposed transverse fixed shaft;
   c. a reel contained within the frame and rotatably supported thereon on the transverse fixed shaft;
   d. said reel further comprising a central core section on said transverse fixed shaft;
   e. spring means fixedly secured at one end to said transverse fixed shaft and fixedly secured at its other end to said core of said reel, and wound between said transverse fixed shaft and said core;
   f. a generally flat length of perforated hose sealably attached at one end to the core and wound around said reel;
   g. said generally flat length of perforated hose having a first cross-section which is generally rectangular, said hose being expandable and having a second cross-section when expanded;
   h. a generally rectangular shaped slot located in said generally rectangular shaped frame and having a cross-section slightly larger than said first cross-section of said hose such that said generally flat length of perforated hose passes through the generally rectangular shaped slot as it is unwound from the reel;
   i. a coupling means for receiving a source of water located at the other end of said length of perforated hose;
   j. the lower portion of said generally rectangular shaped frame containing a pair of integrally molded downwardly facing spikes to facilitate insertion of the generally rectangular shaped frame into the ground;
   k. a pointed securing means located adjacent the coupling means; and
   l. said generally flat length of perforated hose containing a multiplicity of pin holes at spaced locations on its upper surface;
   m. whereby said generally flat length of perforated hose can be passed through said generally rectangular shaped slot as a portion of the hose is unwound from said reel and is anchored to the ground through said pointed securing means located adjacent the coupling means, a source of water can be attached to said coupling means to permit water to exit the hose through said multiplicity of pin holes, the generally rectangular shaped slot will act as a seal to prevent the water from entering the portion of the hose which remains on the reel when the portion of the hose unwound from the reel is expanded by the water to attain said second cross-section, and the spring means will automatically rewind the generally flat length of perforated hose when the source of water is removed from the coupling means and the pointed securing means adjacent said other end of the generally flat length of perforated hose is removed from the ground.

2. The invention as defined in claim 1 wherein said spring means is a spring.

3. The invention as defined in claim 1 wherein said reel contains a multiplicity of serrations on its outermost periphery to facilitate manual rewinding of the hose onto the reel.

* * * * *